July 30, 1963 R. L. FRANK ETAL 3,099,835
PHASE CODED HYPERBOLIC NAVIGATION SYSTEM
Filed May 31, 1956 3 Sheets-Sheet 1
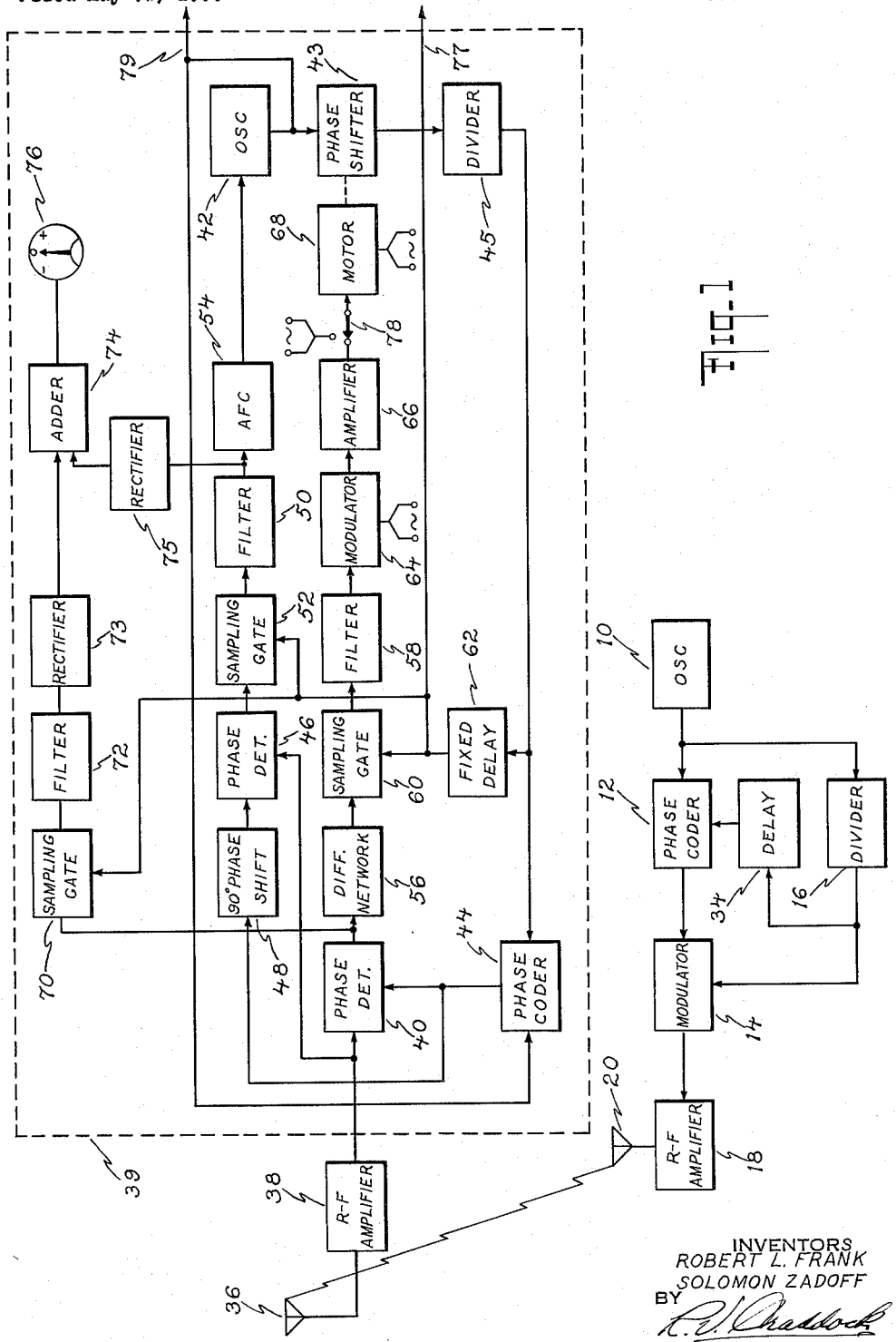
INVENTORS
ROBERT L. FRANK
SOLOMON ZADOFF
BY
ATTORNEY

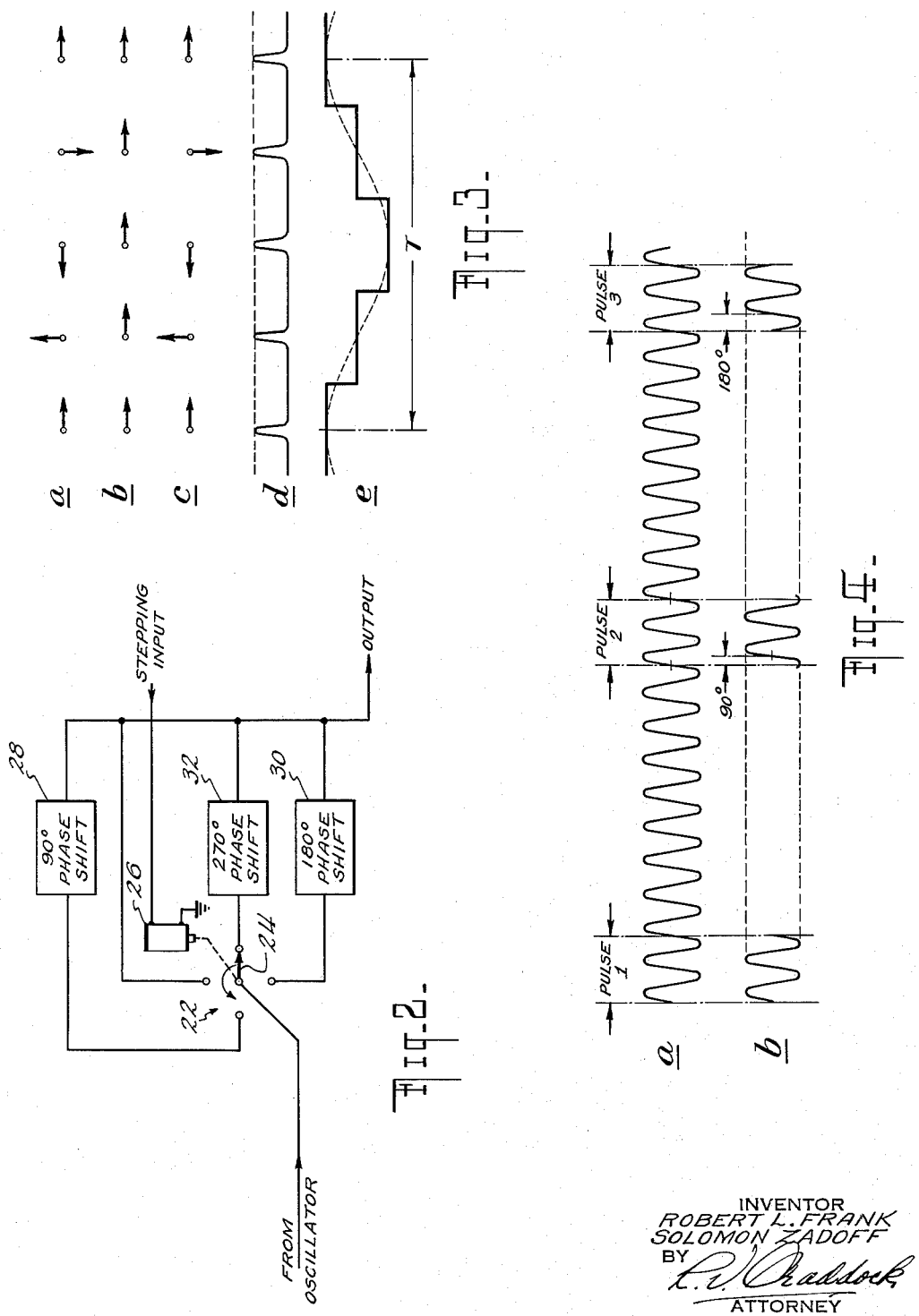

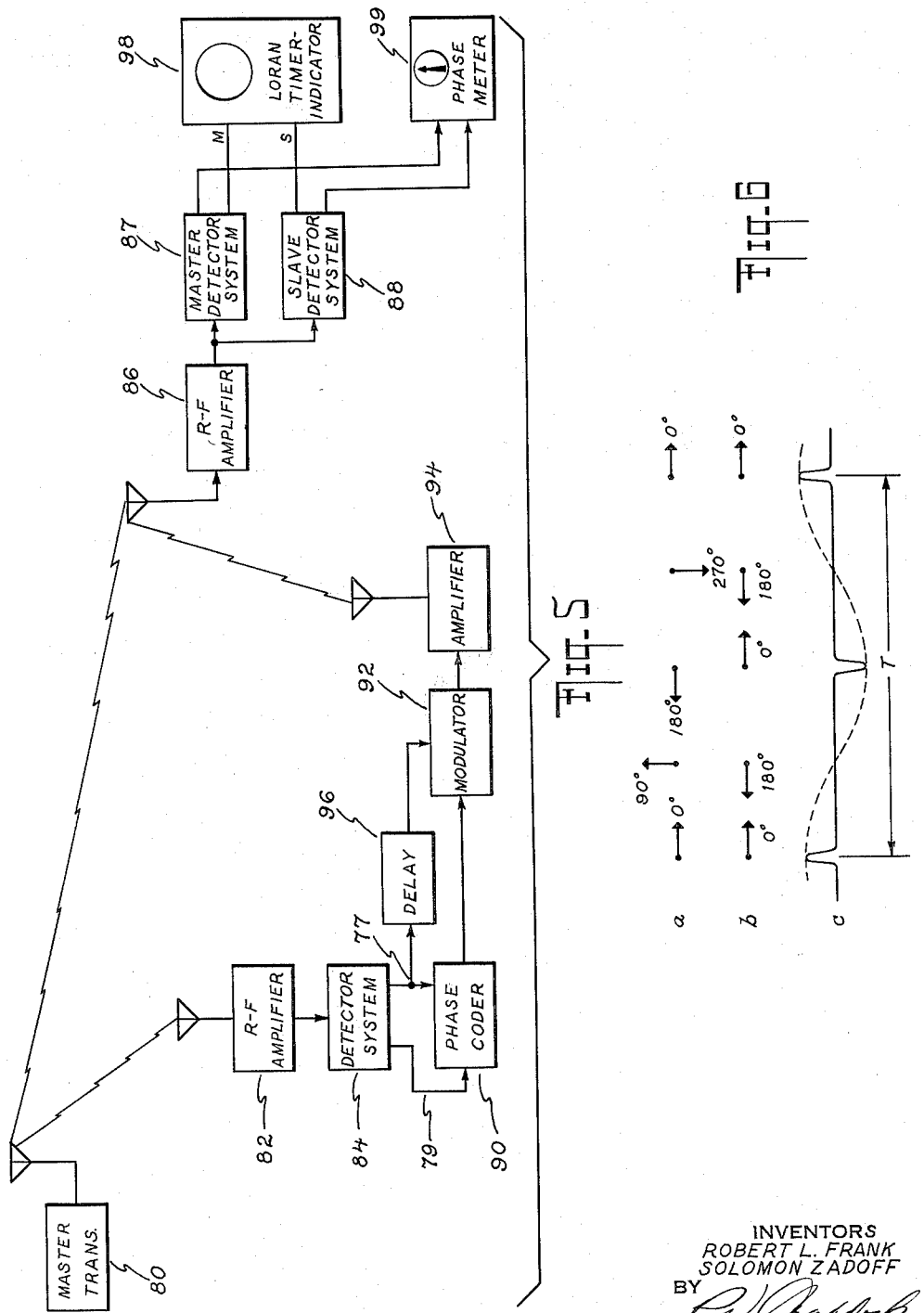

United States Patent Office 3,099,835
Patented July 30, 1963

3,099,835
PHASE CODED HYPERBOLIC NAVIGATION SYSTEM
Robert L. Frank, Great Neck, and Solomon Zadoff, Flushing, N.Y., assignors to Sperry Rand Corporation, a corporation of Delaware
Filed May 31, 1956, Ser. No. 588,570
12 Claims. (Cl. 343—103)

This invention relates to pulse modulated communication systems, and more particularly is concerned with apparatus for providing improved detection of information pulses, such as loran master and slave pulses, in the presence of interference.

Hyperbolic navigation systems, such as loran, are well known in the art. Such systems make use of the measurement of the time intervals between two signals received from two distince fixed points. This time difference, as measured at the receiver, establishes a line of position. The accuracy of a system such as loran, in which the envelopes of pulse modulated carriers from two transmitting stations are compared, depends to a large degree on the detection of loran signals in the presence of interference of all kinds.

It is known that an amplitude detector has a suppressing effect on the signal in the presence of noise. Various non-suppressing detector systems have heretofore been proposed to improve detection in the presence of noise. For example, a phase detector in which the reference signal is made phase coherent with the incoming carrier, plus a low-pass filter on the outputs of the phase detector, acts as a non-suppressing detector. Another known non-suppressing detection system involves the use of a narrow sampling gate which samples a pulsed carrier at the crest of an R-F (radio frequency) cycle once each pulse repetition interval. Such a detector provides phase discrimination in favor of the desired signal, as opposed to random noise. A low-pass filter at the output of the sampling gate produces a D.-C. (direct current) output proportional in magnitude to the amplitude of the incoming signal while rejecting the randomly varying noise passed by the gate.

Non-suppressing detectors of the above-mentioned types do not provide discrimination in favor of the signal in the presence of phase coherent interference, such as a C.W. (continuous wave) jamming signal of the same frequency as the carrier signal. Although a jamming signal would presumably not remain phase coherent over an indefinite period of time because of a slight difference in frequency with respect to the desired signal, the filter on the output of the sampling gate in such a non-suppressing detector as mentioned above, would have to be very sharply tuned to pass the desired signal and block the unwanted one.

It is the general object of the present invention to provide a detection system which gives improved detection of the desired signal in the presence of interference, and more particularly, in the presence of unwanted signals of substantially the same carrier frequency as the desired signal.

Another object of this invention is to provide a radio navigation apparatus in which the transmitted signals are modified in such manner that they can be distinguished from interference, including C.W. jamming at substantially the frequency of the carrier, by suitable detection means at the receiver.

Another object of the invention is the provision of a hyperbolic navigation system in which the transmitted master and slave signals can be readily identified and separated at the receiver.

Another object of the invention is to provide a hyperbolic navigational system in which the delayed skywave pulses received at the same time as subsequently transmitted ground wave pulses are rejected by the receiver.

These and other objects of the invention which will become apparent as the description proceeds are achieved in a pulse hyperbolic navigation system by phase coding the transmitted master and slave pulses. Phase coding according to the present invention involves shifting the phase of the carrier at the transmitter in steps of predetermined amounts of phase shift between pulses. The receiver uses phase detectors in which the reference signals are stepped in phase by amounts identical to the steps at the transmitter. Servos control the frequency of the input to the phase coding circuits and the stepping of the phase coding circuits at the receiver to track the phase coded received signals from the respective master and slave transmitters.

For a better understanding of the invention, reference should be had to the accompanying drawings, wherein:

FIG. 1 is a block diagram of a transmitter and receiver using a phase coded detection system according to the present invention;

FIG. 2 is schematic diagram of a suitable phase coding circuit.

FIGS. 3a–e are a series of vector diagrams and graphical plots useful in explaining the operation of the present invention;

FIG. 4 is a graphical plot of a non-phase coded signal and a phase coded pulsed signal;

FIG. 5 is a block diagram of a hyperbolic navigational system incorporating the features of the present invention; and FIGS. 6a–c are a series of vector diagrams and graphical plots useful in explaining the operation of the navigational system of FIG. 5.

Referring to FIG. 1, the numeral 10 indicates generally an oscillator, preferably frequency controlled, so that it generates a highly stable output having a frequency, for example, of the order of 100 kc. The output of the oscillator 10 is fed to a phase coder 12, to be hereinafter more fully described, which is arranged to introduce predetermined mounts of phase shift in the signal derived from the oscillator 10. The output of the phase shift coder 12 is fed to a modulator 14 where it is pulse modulated at a predetermined pulse repetition frequency. The modulating pulses may be derived, for example, from a divider 16 coupled to the output of the oscillator 10. The pulse modulated carrier signal from the modulator 14 is amplified in a radio frequency (R.-F.) amplifier 18 and transmitted by means of an antenna 20.

The phase coder 12 may take the form of the circuit shown in FIG. 2, which includes a solenoid-operated stepping switch indicated generally at 22. The stepping switch 22 may have any number of poles, as desired, four poles being shown in the figure by way of example only. A stepping switch of conventional design includes a ratchet-operated contact arm 24 which is actuated by a solenoid 26, so that every electrical impulse supplied to the solenoid 26 advances the contact arm 24 to the next pole.

Each of the poles of the stepping switch 22 is connected to a common output through phase shift networks which introduce differing amounts of fixed phase shift. For example, successive poles may be connected respectively to a 90° phase shift network 28, a 180° phase shift network 30, and a 270° phase shift network 32, the remaining pole being connected directly to the output to introduce 0° phase shift. Thus, as the contact arm 24 advances counterclockwise, the output of the phase coder is phase shifted in steps of 0°, 90°, 180°, and 270°, respectively.

As shown in FIG. 1, pulses for stepping the phase coder are derived from the output of the divider 16 through a delay 34 so that the stepping switch 22 is advanced one step for each pulse repetition interval. The delay 34 insures that the stepping takes place between output pulses of the pulsed carrier signal.

The effect of the phase coder 12 on the output from the modulator 14 can be appreciated by reference to FIG. 3, which shows the vectors representing R-F pulses out of the modulator at a, and the corresponding vector of the input to the phase coder at b. Thus, the first pulse is in phase with the output of the oscillator 10, the next pulse is 90°, the third pulse is 180°, the fourth pulse is 270°, and the next pulse is back in phase, so that over four repetition intervals of the pulse modulated output, the phase of the carrier advances by 360°, or one cycle.

FIG. 4 shows the phase coding effect in graphical rather than vector form. In FIG. 4a, the continuous wave output of oscillator 10 is shown. FIG. 4b shows the effect on the output of the modulator 14 with phase coding introduced. Thus, the R-F signal during the second pulse appears to be delayed 90° and the R-F signal during the third pulse appears to be delayed 180° in relation to the continuous wave.

The pulse modulated phase coded signal radiated by the antenna 20 (FIG. 1) is received at a receiving antenna 36 and amplified by a suitable R-F amplifier 38. The output of the R-F amplifier 38 is applied to a phase coded detector system indicated generally at 39. The detector system includes a conventional phase detector 40 coupled to the output of the R-F amplifier 38. The reference voltage applied to the phase detector 40 is derived from an oscillator 42, which is designed to be highly stable and to operate at substantially the same frequency as the oscillator 10. The output from the oscillator 42 is coupled to the phase detector 40 through a phase coder 44 which is identical to the phase coder 12 in the transmitter, such as described in connection with FIG. 2. Thus, the phase coder 44 is designed to introduce fixed amounts of phase shift corresponding to the amounts and in the same sequence as the phase shift steps introduced by the phase coder 12. The phase coder 44 is triggered by pulses derived from the oscillator 42 by a divider 45 coupled to the oscillator 42 through a continuously variable phase shifter 43. The divider 45 is such as to give the same output pulse repetition rate as produced by the divider 16 at the transmitter.

It will be appreciated that by proper adjustment of the frequency and phase of the oscillator 42, and by stepping the phase coder 44 in a proper sequence in relation to the phase coder 12 at the transmitter, a reference signal may be applied to the phase detector 40 which has a fixed phase relation at all times with the carrier of the pulsed signal from the amplifier 38, in which case the phase detector 40 acts as an amplitude detector wherein the amplitude of the output varies directly with the changes in amplitude of the received signal. The output from the phase detector 40 is then a plurality of pulses corresponding to the modulating pulse envelope of the received signal. By making the fixed phase relation between the reference from the phase coder 44 and the received signal equal to 0°, maximum amplitude of the detector output is achieved.

The vector diagram of FIG. 3a corresponds to the received signal at the output of the amplifier 38 and the vector diagram of FIG. 3c represents the reference signal at the output of the phase coder 44 when the oscillator 42 and phase coder 44 are properly adjusted to maintain a fixed phase relation between the received signal and the reference signals. It will be seen that the reference and received signals remain in phase during successive pulses. The resulting output from the phase detector 40 is shown in FIG. 3d and comprises a series of pulses of the same polarity, corresponding to the envelopes of the received pulse modulated carrier signal.

However, assume that a signal without phase coding is also received, as, for example, a C.W. jamming signal at the carrier frequency of the oscillator 10. The vector diagram of such received signal is shown in FIG. 3b. It will be seen by comparing the vector diagrams of FIG. 3b and FIG. 3c that the reference signal from the phase coder 44 will be successively in phase, 90° out of phase, 180° out of phase, 270° out of phase, and in phase again with the C.W. jamming signal during successive intervals occurring at the repetition frequency of the output of the divider 45. The resulting output from the phase detector 40 is a step wave, as shown in FIG. 3e, with the output having maximum amplitude of one polarity during the interval in which the phase coded reference is in phase with the C.W. received signal and a maximum amplitude of the opposite polarity during the interval in which the phase coded reference is 180° out of phase with the C.W. signal.

The received signal without phase coding, using a phase coded reference, produces no D.-C. component in the output of the detector 40, whereas the phase coded signal, using a similar phase coded reference, does produce a D.-C. component in the output of phase detector. This is the signal waveforms of FIGS. 3d and 3e. The fundamental of the detector output resulting from the unphasecoded signal is shown by the dotted line in FIG. 3e and has a frequency determined by the switching rate and phase shift per step of the phase coder. In the case described, where 90° phase shifts are introduced, the fundamental frequency is one fourth the stepping rate of the phase coder. By means of a suitable low-pass filter which blocks this fundamental frequency and higher frequencies but passes the D.-C. component from the phase detector 40, an output signal can be derived from the phase detector 40 in response to the desired received signal only.

The output of the phase detector 40 can be utilized by means hereinafter described to control the phase shifter 43 to produce pulses from the divider 45 at the receiver that are synchronized with the pulses from the transmitter. Thus, pulses that are synchronized with the received pulse envelopes of transmitted carrier signals are effectively reproduced without interference at the receiver.

To this end, a first servo loop is provided to control the oscillator 42 in such manner as to maintain the output of the phase coder 44 in phase with respect to the incoming carrier received from the transmitting station. This servo loop includes a phase detector 46 connected to the output of the R-F amplifier 38. A reference voltage is derived from the output of the phase coder 44 and coupled to the phase detector 46 through a 90° phase shift network 48. It will be seen that when the desired in-phase relationship exists between the reference and the incoming signal at the phase detector 40, a 90° phase relationship will exist between the reference and the received signal at phase detector 46, so that the output of the phase detector 46 goes to zero.

The output of the phase detector 46 is coupled to a low-pass filter 50 through a sampling gate 52, the sampling gate being triggered by means hereinafter described, so as to be gated on during the portion of the time duration of a received pulse. The filter 50 is designed to pass substantially only the D.-C. component in the output of the sampling gate 52. The output of the filter then is a D.-C. error signal whose magnitude and polarity are indicative of the phase displacement between the output of the phase coder 44 as derived from the oscillator 42 and the carrier of the incoming signals. This D.-C. error signal is applied to an automatic frequency control circuit 54, which may be a well-known reactance tube type circuit for controlling the frequency of the oscillator 42.

In order to reproduce the modulation pulses of the received signal in noise-free form in response to the output of the phase detector 40, a second servo loop is provided. The output from the phase detector 40 is differentiated by a suitable differentiating network 56, the differentiating network providing an output signal that has a zero cross-over point corresponding to the center of the pulse envelope as derived from the phase detector 40. The output of the differentiating network is coupled to a filter 58 through a sampling gate 60, the filter and sampling gate being identical to the filter 50 and sampling gate 52 in the first servo loop. The sampling gate 52 and the sampling gate 60 are gated open simultaneously by the same trigger as derived from the divider 45 through a fixed delay circuit 62.

The output of the filter 58 is then a D.-C. error signal that goes to zero when the sampling gate 60 samples the output of the differentiating network at the zero crossover point of the differentiated pulse from the detector 40. Any relative shift between the opening of the sampling gate 60 and the time of the pulses appearing at the output of the phase detector 40 produces an error signal at the output of the filter 58 which can be modulated by a modulator circuit 64 to which is applied a 400-cycle reference voltage, for example. The output of the modulator 64 is amplified by a suitable power amplifier 66 and applied to an A.-C. servomotor 68. The servomotor 68 drives the variable phase shifter 43 in such manner as to delay or advance the output pulses from the divider 45 so as to shift the time at which the sampling gate 60 is triggered. The error signal at the output of the filter 58 is thereby reduced to zero.

In order that the second servo loop may lock on to the zero cross-over point of the output from the differentiating network 56, the triggers applied to the sampling gates 52 and 60 must first be brought into substantial coincidence with the received pulses by manual means. This is accomplished by sampling the output of the phase detector 40 through a sampling gate 70 triggered in coincidence with the sampling gates 52 and 60, and filtering the output of the sampling gate 70 through a low-pass filter 72 to derive a D.-C. signal in response to the detector 40. This signal is passed through a full wave rectifier 73 to produce an output of one polarity, and coupled through an adder circuit 74 to a D.-C. meter 76.

Also coupled to the meter 76 through the adder 74 is the full wave rectified output from a rectifier 75 connected to the output of the filter 50 in the first servo loop. By this arrangement an indication appears on the meter 76 only when the sampling gates open in substantial coincidence with the received pulses. By deriving an indicating voltage from the output of both the phase detector 40 and the phase detector 46, an indication will appear on the meter regardless of the phase relationship between the reference voltage from the phase coder and the carrier of the received signals when the sampling gates 60 and 70 are triggered during a received pulse.

A switch 78 is provided on the input of servomotor 68 by means of which the servomotor can be connected to an A.-C. (alternating current) voltage source. Thus, by means of the switch 78 the motor can be caused to drive the phase shifter 43 until an indication appears on the meter 76, showing that the triggering of the sampling gates 60 and 70 is substantially coincident with the received pulses. The switch 78 is then switched back to connect the servomotor 68 to the output of the amplifier 66 so that automatic control by the second servo loop is initiated.

Once the second servo loop is operating so that the sampling gates are triggered in coincidence with the received pulses, the first servo loop operates to bring the output of the phase coder 44 into phase coherence with the received carrier signal. Since the phase coder 44 is now stepped at the same rate as the phase coder 12 at the transmitter, and since the phase coders 12 and 44 are designed to introduce equal phase shifts of 90° in the particular embodiment illustrated in FIG. 1, it is not necessary that the phase coder 44 be adjusted so as to introduce the same amount of phase shift at the receiver as is being introduced by the phase coder at the transmitter. For example, if at the time of receiving a particular pulse, the phase coder 44 is set at a position to introduce 180° phase shift in the output of the oscillator 42, while the phase coder 12 at the transmitter is in a position to introduce a 90° phase shift, the receiver automatically compensates for this phase difference by advancing the phase of the oscillator 42 by 90°, so that the output of the phase coder 44 is in phase with the received carrier signal.

However, if the phase coders 12 and 44 are designed to produce unequal amounts of phase shifts during successive steps, it will be appreciated that the phase coders 12 and 44 must be brought into step so that they are introducing like phase shifts on successive steps. This may readily be accomplished at the receiver by providing suitable means, such as a switch between the phase coder 44 and the output of divider 45, whereby the phase coder 44 can be momentarily halted in its stepping action until the phase coder 12 and phase coder 44 are brought into the proper step relationship. When they are in the proper step relationship can be determined by the indicator 76, since maximum output from the phase detector 40 is obtained only when the phase of the reference voltage derived from the output of phase coder 44 is phase coherent with the received carrier signal through every step of the phase coders.

It will be seen that in operation, the receiving system generates pulses derived from the fixed delay 62 by lead 77 that are synchronized with the pulses from the transmitter. These locally generated pulses are synchronized even in the presence of C.-W. jamming. Moreover, the output of oscillator 42 appearing on the output lead 79 is synchronized with the carrier at the transmitter before it is phase coded, provided the phase coders 12 and 44 are in step, i.e., the phase coders introduce the same amount of phase shift at the transmitter and receiver at any given instant of time.

As pointed out above, if a non-symmetrical phase code is used, the two-phase coders 12 and 44 can be easily brought into step by maximizing the indication on the meter 76. However, if a symmetrical phase code is used, such as the four 90° phase steps used in the illustrated embodiment, some external timing means must be employed to insure that the phase coders 12 and 44 are in step if the output of the oscillator is going to be properly synchronized with the non-phase-coded carrier signal at the transmitter. For example, a separate synchronizing pulse can be transmitted at a different carrier frequency at the transmitter for synchronizing the phase coder 44 with the phase coder 12, in which case the output of the oscillator 42 could be automatically synchronized with the non-phase-coded carrier signal at the transmitter by known methods.

The detection system as thus far described is particularly useful in a hyperbolic navigation system, such as shown in FIG. 5. In such a system, as for instance in the well known loran navigation system in general use in large parts of the world, two transmitting stations, referred to as the master and slave stations respectively, are positioned at widely spaced points and transmit pulses in a predetermined and known time relation. By measuring the difference in time of arrival of these pulses at the receiver, a line of position can be determined at the receiver.

In applying the present invention to such a navigational system, a master transmitter 80 is provided which is substantially identical to the transmitting station described in connection with FIG. 1. The master transmitter sends out phase coded pulses which are received at the slave transmitter, amplified by a suitable R-F amplifier 82, and applied to detector system 84. The detector system is substantially identical to the detector system 39 described in connection with FIG. 1.

The output from the local oscillator in the detector system 84 is coupled over lead 79 to a phase coder 90, the output of which is modulated by a suitable pulse modulator circuit 92, amplified by an amplifier 94, and transmitted as the slave signal. The phase coder 90 at the slave station provides a different phase code than the phase coder at the master transmitter. For instance, the phase coder at the master transmitter may be the one shown in FIG. 2, in which the phase is shifted by 90° in four steps, while the phase coder 90 at the slave station may introduce 180° phase shift in two steps. The vector diagrams of FIGS. 6a and 6b show the phase shifts in the pulse output of the master transmitter and slave transmitter, respectively.

The phase coder 90 is triggered by pulses derived from the detector system 84 over lead 77, the pulses being coincident with the received pulses from the master transmitter. Thus, the output of the slave receiver in phase coded at the same repetition rate as at the master transmitter. The same pulses are coupled through a delay network 96 to the modulator 92 so as to modulate the signal from the slave transmitter. The delay network 96 insures that the output of the phase coder is pulsed between steps of the phase coder and also insures that the slave station does not transmit at the same time the slave receiver is receiving pulses from the master transmitter.

The master and slave signals are picked up by a receiver located on a navigating vessel, the receiver includes an R-F amplifier 86, the output of which is coupled to a master detector system 87 and a slave detector system 88 which are substantially identical to the detector system 39 described in connection with FIG. 1.

The master detector system 87 at the receiver has a phase coder identical with the phase coder at the master transmitter 80 while the slave detector system 88 at the receiver has a phase coder identical to the phase coder 90 at the slave transmitter.

Different phase codings of the master signal and the slave signal provide mutual rejection by the detector systems at the receiver. This may be appreciated by considering the vector diagrams of FIG. 6 representing the master and slave codes. If the reference voltage applied to the phase detector in the master detector system 87 corresponds to the phase code shown in vector form in FIG. 6a and the phase coded signal received from the slave station and applied to the same phase detector has a phase code as shown by the vector diagram in FIG. 6b, the output of the detector will have the pulse wave form shown in FIG. 6c. It will be seen from the wave form of FIG. 6c that no D.-C. component exists in the output of the phase detector in such case, so that no output is produced by the low-pass filter in the master detector system as indicated by the meter 76 (FIG. 1). Therefore in manually adjusting the detector systems to synchronize the sampling gate triggers with the received pulses (and aligning the phase coders where a nonsymmetrical code is used), the meter indication is maximized in the respective detector systems 87 and 88 only in response to received signals having the same coding as the respective phase coded references.

The sampling gate triggers from the detector systems 87 and 88 are coupled to a standard loran indicator 98, such as described in Patent No. 2,651,033, by which the time difference between the respective triggers from master and slave detector systems are accurately measured. Since, as pointed out above, the output from the local oscillator in each detector system is synchronized with the master and slave carriers before phase coding, a phase meter 99 may be coupled to the local oscillators of the master and slave detector systems to measure the phase difference between the two oscillators. The phase difference is an accurate measure of the time difference between the signals received from the master and slave stations, since the phase relation between the oscillators at the master and slave stations is fixed. Thus a coarse and fine time difference reading are provided to give improved accuracy in a manner similar to the teaching in copending application Serial No. 577,187, filed April 6, 1956, now Patent No. 2,811,718, issued October 29, 1957, in the name of Robert L. Frank. The measured time difference can be utilized by known techniques on a suitable chart to establish a line of position for the receiver.

From the above description it will be recognized that the various objects of the invention have been achieved by the provision of a phase coded transmission system which provides improved signal response, even in the presence of a C.W. jamming interference. The detection system described, namely, a phase detector and low-pass filter, with or without the sampling gate, constitutes cross-correlation type of detection process, which is a fundamental concept of radio communication. The cross-correlation process involves the mixing of two signals from separate sources, only one of which is transmitted and therefore contains noise. This is in contrast to an auto-correlation process in which both signals at the mixer are derived from the transmitted signal and therefore both contain noise. An amplitude detector is a common example of an auto-correlator.

The cross-correlating detection system, without phase coding, has much better noise discrimination than an auto-correlating detection system. However, the cross-correlation system does not discriminate against interfering signals that are harmonically related to the repetition rate of the pulsed signal from the master and slave transmitters. Phase coding at the transmitter and receiver in conjunction with a cross-correlating detection system as described provides greatly improved discrimination against interference that is harmonically related to the pulse repetition rate, for example, interference at the carrier frequency.

The non-suppressing or cross-correlating detection system utilizing phase coding is particularly suited to hyperbolic navigation systems, as described, where the information is in the form of a time difference between pulses from two separate sources. Phase coding offers advantages in a hyperbolic navigation system in addition to improved discrimination against interference. For example, it provides a means of discriminating and separating the master and slave signals at the receiver. Heretofore, this was done by delaying the slave transmission by half the repetition interval between pulses plus an additional delay to insure that the slave pulse is always received after the master pulse. By eliminating the "dead time" required in standard loran to facilitate identification of the master and slave pulses, phase coding permits a much higher repetition rate to be used. Thus the duty cycle of the system can be increased with a resultant gain in average power with no increase in peak power. As a result the signal-to-noise ratio is increased, making possible an extension of the usable range of the system.

Phase coding also provides improved skywave rejection. It will be appreciated that if a master skywave signal is received at the same time as a slave groundwave signal, phase coding will reject the master skywave signal in the slave signal detector system at the receiver. The sampling gates of course reject skywaves received at any time other than in coincidence with succeeding pulses.

While a particular phase coder, such as shown in FIG. 2, has been described, it will be appreciated that other means may be utilized to provide stepped phase shifts of predetermined amount in the pulsed carrier signal. For example, a gated oscillator of the type that oscillates in a fixed phase relationship to its gating signal may be used as the carrier source. By programming the intervals at which the oscillator is gated on, the relative phase between the carrier signal of successive pulses may be varied. The stepping switch phase coder is described in particular as one suitable way of accomplishing phase coding.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulsed carrier communication system comprising transmitting means including a source of pulsed electromagnetic energy waves, and phase coding means for shifting by a respective and discrete predetermined amount the phase of each successive pulsed wave; and a receiver including means for receiving the phase shifted waves from the transmitting means, an oscillator having substantially the same output frequency as said electromagnetic energy waves, phase coding means for periodically shifting the phase of the oscillator output in discrete predetermined amounts, said phase coding means introducing phase shifts of the same amount and in the same sequence as the phase shifting means included in the transmitting means, first servo means for synchronizing the output of the phase coding means with the received electromagnetic energy waves including a phase detector coupled respectively to the output of the phase coding means and the received electromagnetic waves, a sampling gate coupled to the output of the phase detector, a low-pass filter coupled to the output of the sampling gate, and means responsive to the output of the filter for controlling the frequency and phase of the oscillator output, whereby the frequency is adjusted to reduce the output of the phase detector to zero, means for generating pulses at substantially the repetition frequency of the received pulses of electromagnetic energy waves, second servo means for synchronizing said pulse generating means with the received pulses of electromagnetic energy waves including a phase detector coupled respectively to the output of the phase coding means and the received electromagnetic waves, means for differentiating the output of the phase detector, a sampling gate coupled to the output of the differentiating means, a low-pass filter coupled to the output of the sampling gate, means responsive to the output of the filter for controlling the phase of the pulse generating means, and means for coupling the output of the pulse generating means to the sampling gates in the first and second servo means, whereby the second servo means controls the pulse generating means to open the gates momentarily at a selected time during the reception of an electromagnetic energy pulse, and means for actuating the phase coding means in response to the output of the pulse generating means to shift the phase of the reference signal applied to the respective phase detectors of the first and second servo means.

2. A pulsed carrier communication system comprising transmitting means including a source of pulsed electromagnetic energy waves, and phase coding means for shifting by a respective and discrete predetermined amount the phase of each successive pulsed wave; and a receiver including means for receiving the phase shifted waves from the transmitting means, an oscillator having substantially the same output frequency as said electromagnetic energy waves, phase coding means for periodically shifting the phase of the oscillator output in discrete predetermined amounts, said phase coding means introducing phase shifts of the same amount and in the same sequence as the phase shifting means included in the transmitting means, first servo means for synchronizing the output of the phase coding means with the received electromagnetic energy waves including a phase detector coupled respectively to the output of the phase coding means and the received electromagnetic waves, a low-pass filter coupled to the output of the phase detector, and means responsive to the output of the filter for controlling the frequency and phase of the oscillator output, whereby the frequency is adjusted to reduce the output of the phase detector to zero, means for generating pulses at substantially the repetition frequency of the received pulses of electromagnetic energy waves, second servo means for synchronizing said pulse generating means with the received pulses of electromagnetic energy waves including a phase detector coupled respectively to the output of the phase coding means and the received electromagnetic waves, means for differentiating the output of the phase detector, a sampling gate coupled to the output of the differentiating means, a low-pass filter coupled to the output of the sampling gate, means responsive to the output of the filter for controlling the phase of the pulse generating means, and means for coupling the output of the pulse generating means to the sampling gate, whereby the second servo means controls the pulse generating means to open the gate momentarily at a selected time during the reception of an electromagnetic energy pulse, and means for actuating the phase coding means in response to the output of the pulse generating means to shift the phase of the reference signal applied to the respective phase detectors of the first and second servo means.

3. A pulsed carrier communication system comprising transmitting means including a source of pulsed electromagnetic energy waves, and phase coding means for shifting by a respective and discrete predetermined amount the phase of each successive pulsed wave; and a receiver including means for receiving the phase shifted waves from the transmitting means, an oscillator having substantially the same output frequency as said electromagnetic energy waves, phase coding means for periodically shifting the phase of the oscillator output in discrete predetermined amounts, said phase coding means introducing phase shifts of the same amount and in the same sequence as the phase shifting means included in the transmitting means, means for synchronizing the output of the phase coding means with the received electromagnetic energy waves including a phase detector coupled respectively to the output of the phase coding means and the received electromagnetic waves, and means responsive to the output of the phase detector for controlling the frequency and phase of the oscillator output, whereby the frequency is adjusted to reduce the output of the phase detector to zero, means for generating pulses at substantially the repetition frequency of the received pulses of electromagnetic energy waves, and servo means for synchronizing said pulse generating means with the received pulses of electromagnetic energy waves including a phase detector coupled respectively to the output of the phase coding means and the received electromagnetic waves, means for differentiating the output of the phase detector, a sampling gate coupled to the output of the differentiating means, a low-pass filter coupled to the output of the sampling gate, means responsive to the output of the filter for controlling the phase of the pulse generating means, and means for coupling the output of the pulse generating means to the sampling gate, whereby the servo means controls the pulse generating means to open the gate momentarily at a selected time during the reception of an electromagnetic energy pulse.

4. A pulsed carrier communication system comprising transmitting means including a source of pulsed electromagnetic energy waves, and phase coding means for shifting by a respective and discrete predetermined amount the phase of each successive pulsed wave; and a receiver including means for receiving the phase shifted waves from the transmitting means, an oscillator having substantially the same output frequency as said electromagnetic energy waves, phase coding means for periodicaly shifting the phase of the oscillator output in discrete predetermined amounts, said phase coding means introducing phase shifts of the same amount and in the same sequence as the phase shifting means including in the transmitting means, means for synchronizing the output of the phase coding means with the received electromagnetic energy waves, means for generating pulses at substantially the repetition frequency of the received pulses of electromagnetic energy waves, and servo means for synchronizing said pulse generating means with the received pulses of electromagnetic energy waves including a phase detector coupled respectively to the output of the phase coding means and the received electromagnetic waves, means for differentiating the output of the phase detector, a sampling gate coupled to the output of the differentiating means, a low-pass filter coupled to the output of the sampling gate, means responsive to the output of the filter for controlling the phase of the pulse generating means, and means for coupling the output of the pulse generating means to the sampling gate, whereby the servo means controls the pulse generating means to open the gate momentarily at a selected time during the reception of an electromagnetic energy pulse.

5. A pulsed carrier communication system comprising transmitting means including a source of pulsed electromagnetic energy waves, and phase coding means for shifting by a respective and discrete predetermined amount the phase of each successive pulsed wave; and a receiver including means for receiving the phase shifted waves from the transmitting means, an oscillator having substantially the same output frequency as said electromagnetic energy waves, phase coding means for periodically shifting the phase of the oscillator output in discrete predetermined amounts, said phase coding means introducing phase shifts of the same amount and in the same sequence as the phase shifting means included in the transmitting means, means for synchronizing the output of the phase coding means with the received electromagnetic energy waves, pulse generating means and servo means responsive to the output of said receiver phase coding means and said received electromagnetic energy waves for synchronizing said pulse generator with the received pulses of electromagnetic energy waves in a predetermined time relationship thereto.

6. A receiver for detecting phase coded electromagnetic wave signals in the presence of noise and C.W. jamming comprising means for receiving and amplifying said phase coded signals, a phase detector coupled to the receiving and amplifying means, a reference signal source, means for shifting the phase of the reference signal in discrete steps of predetermined amounts of phase shift, to produdce a phase coded reference signal having the same instantaneous phase and phase progression as that of said received phase coded signals, the output of the phase shifting means being coupled to the phase detector, and low-pass filtering means coupled to the output of the phase detector for producing a signal varying in response to the D.-C. component of the phase detector output.

7. A demodulator for detecting phase coded electromagnetic signals comprising a source of phase coded reference waves having the same instantaneous phase and phase progression as that of said signals, a phase detector having a first input coupled to said signals and a second input coupled to said waves and an output connected to a low-pass filter to reject substantially all frequencies other than zero frequency and to pass the D.-C. component of the phase detector output.

8. A radio navigation system comprising a master transmitter including means for generating a succession of master pulsed carrier signals, and means for shifting by a respective and discrete predetermined amount the phase of each successive master pulsed carrier signal, a slave transmitter including means for generating a succession of slave pulsed carrier signals, means for synchronizing the timing of the slave pulses with the pulses from the master transmitter, and means for shifting by a respective and discrete predetermined amount the phase of each successive slaved pulsed carrier signal, said amounts of phase shift introduced in the slave transmitter carrier differing from the amounts of phase shift introduced in the master transmitter carrier, and a receiver including means for receiving the pulsed carrier signals from the master and slave transmitters, a plurality of phase detectors each having a pair of inputs, the output of the receiving means being coupled to one input of each of the phase detectors, first means for coupling a reference signal to the other input of the first detector including means for shifting the phase of the reference signal in amounts corresponding to the phase shifts introduced in the carrier from the master station, means responsive to the output of the first detector for generating local pulses at the receiver synchronized in time with the pulses from the master transmitter, second means for coupling a reference signal to the other input of the second detector including means for shifting the phase of the reference signal in amounts corresponding to phase shifts introduced in the carrier from the slave transmitter, means responsive to the output of the second detector for generating local pulses at the receiver synchronized in time with the pulses from the slave transmitter, and utilization means responsive to the time difference between the respective locally generated pulses.

9. A radio system comprising a transmitter including means for generating a succession of pulsed carrier signals, and means for shifting by a respective and discrete predetermined amount the phase of each successive pulsed carrier signal, and a receiver including means for receiving the pulsed carrier signals from the transmitter, a cross-correlating detector having a pair of inputs, the output of the receiving means being coupled to one input of the detector, means for coupling a reference signal to the other input of the first detector including means for shifting the phase of the reference signal in amounts corresponding to the phase shifts introduced in the carrier from the transmitter, and means responsive to the output of the detector for generating local pulses at the receiver synchronized in time with the pulses from the transmitter.

10. A radio system comprising a transmitter including means for generating a succession of pulsed carrier signals, and means for shifting by a respective and discrete predetermined amount the phase of each successive pulsed carrier signal, and a receiver including means for receiving the pulsed carrier signals from the transmitter, a cross-correlating detector having a pair of inputs, the output of the receiving means being coupled to one input of the detector, and means for coupling a reference signal to the other input of the first detector including means for shifting the phase of the reference signal in amounts corresponding to the phase shifts introduced in the carrier from the transmitter.

11. A communication system comprising a transmitter and a receiver, said transmitter including a source of electromagnetic waves, first phase coding means for successively shifting the phase of said waves in discrete predetermined amounts, and means for transmitting said phase shifted waves; said receiver including means for receiving said phase shifted waves, an oscillator having substantially the same output frequency as that of said electromagnetic energy waves, second phase coding means for shifting the phase of the oscillator output in discrete predetermined amounts to produce a locally generated wave, said second phase coding means introducing phase shifts of the same amount and in the same sequence as introduced by the first phase shifting means included in the transmitting means, means for synchronizing the output of the second phase coding means with the received electromagnetic energy waves, a phase detector having two inputs and an output, means for applying the received waves to one of said inputs, means for applying said locally generated wave to the other of said inputs, signal utilization means, and low-pass filtering means for coupling said utilization means to said output of said phase detector.

12. A communication system comprising a transmitter and a receiver, said transmitter including a source of electromagnetic waves, phase coding means for imparting a predetermined phase characteristic to said energy waves by successively shifting the phase of said waves in discrete predetermined amounts, and means for transmitting said phase shifted waves; said receiver including means for receiving said phase shifted waves, demodulating means having a phase response characteristic substantially the same as said phase characteristic of said energy waves for cross-correlating the characteristic phase values of the received energy waves with said phase response characteristic, means for coupling the output of said means for receiving to the input of said demodulating means, signal utilization means, and a low-pass filter for coupling the output of said demodulating means to said utilization means.

References Cited in the file of this patent

UNITED STATES PATENTS

| | | |
|---|---|---|
| 2,580,148 | Wirkler | Dec. 25, 1951 |
| 2,643,819 | Lee et al. | June 30, 1953 |
| 2,676,206 | Bennett et al. | Apr. 20, 1954 |
| 2,718,638 | De Rosa et al. | Sept. 20, 1955 |

FOREIGN PATENTS

| | | |
|---|---|---|
| 724,555 | Great Britain | Feb. 23, 1955 |